DIGITAL TO ANALOG CONVERTER USING A SOLION CELL
Filed Sept. 20, 1963
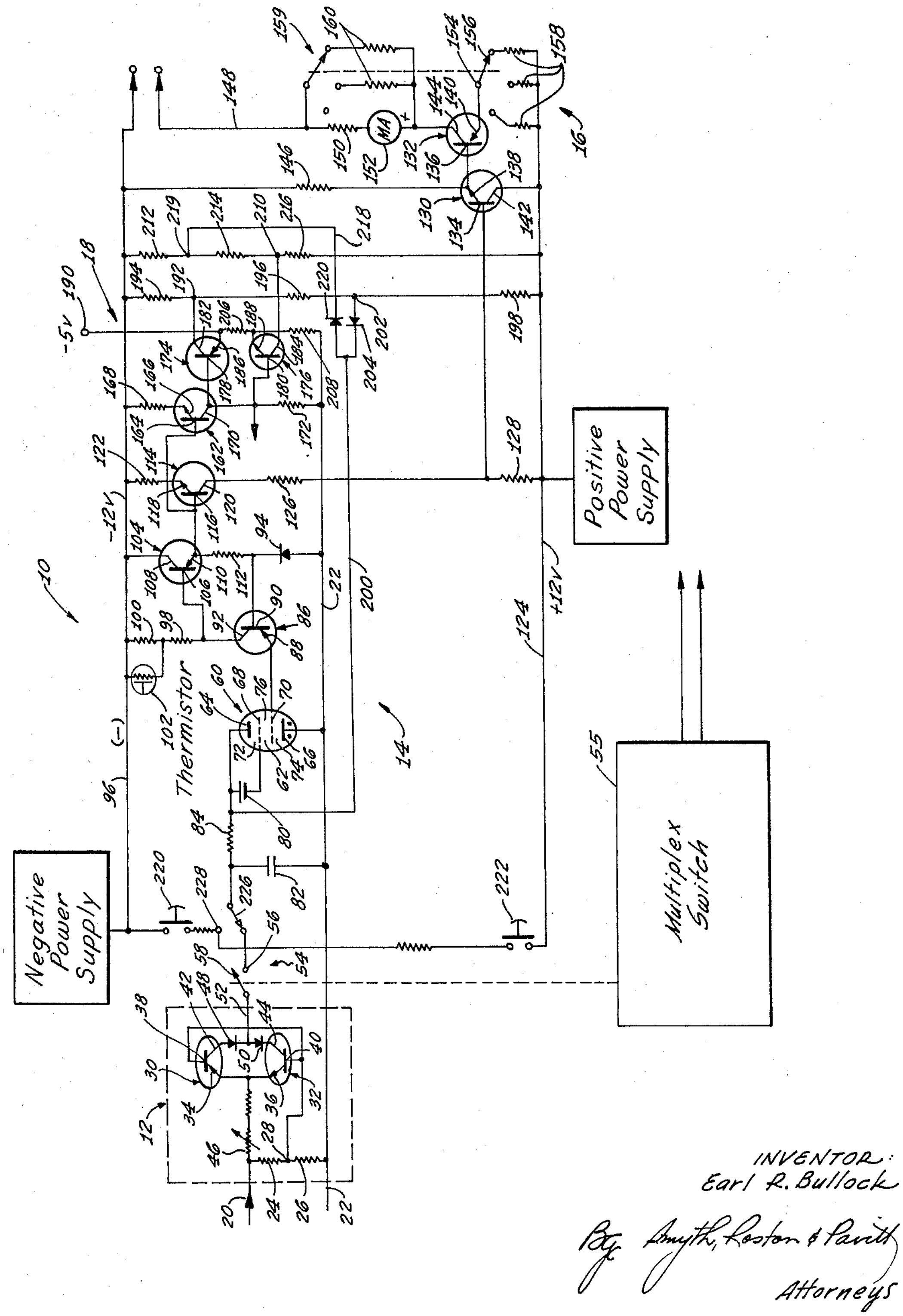
INVENTOR:
Earl R. Bullock
By Smyth, Roston & Pavitt
Attorneys United States Patent Office 3,290,673
Patented Dec. 6, 1966

3,290,673

DIGITAL TO ANALOG CONVERTER USING A SOLION CELL

Earl R. Bullock, Palos Verdes Estates, Calif., assignor to Minnesota Mining and Manufacturing Company, St. Paul, Minn., a corporation of Delaware Filed Sept. 20, 1963, Ser. No. 310,227
10 Claims. (Cl. 340—347)

The present invention relates to signal converters, and more particularly to apparatus for converting an electrical signal from one form to another form of equivalent magnitude.

In many forms of electronic systems, a signal may be produced in one part of the system that is in one form while in other portions of the system, it is desirable to employ a signal that is in different form. For example, in some forms of control systems, it is desirable to provide a so-called digital signal for performing certain measuring, computing operations, etc. Digital signals consist of a series of discrete pulses which are of a predetermined value. Since the system will operate to the nearest pulse, by increasing the number of bits in a signal the error may be reduced to any desired level. In the circuitry required to perform certain operations, the circuitry is simpler and faster when it utilizes digital signals.

The output from the system is frequently a signal that is intended to actuate a transducer such as a proportional value, etc. Such devices normally are not capable of responding to the digital signal. In addition, the digital signal is normally of a transitory nature that will have disappeared before the servomotor can make the desired adjustment. As a result, it is very frequently desirable to be able to convert the digital signal into an analog signal having an amplitude that is proportional to the magnitude of the digital signal. Numerous means have been provided which are effective to convert digital signals to analog signals. However, they have not been entirely satisfactory for numerous reasons. Among other things, they have been complex and unstable and/or inaccurate and also have been unable to maintain the amplitude of the analog signal at a constant amplitude for an interval extending from the conversion of one digital signal to the conversion of the next digital signal.

It is now proposed to provide means for overcoming the foregoing difficulties. More particularly, it is proposed to provide a signal converter for converting a digital signal into an analog signal which is simple and reliable and is capable of maintaining the analog signal at a constant level from the conversion of one digital signal to the conversion of the next digital signal. This is to be accomplished by providing a digital-to-analog converter that employs a solion cell that is effective to integrate the quantity of current or charge that flows into the cell and provides an output current that is a function of the total charge present in the cell.

These and other features and advantages of the present invention will become readily apparent from the following detailed description of one embodiment thereof, particularly when taken in connection with the accompanying drawing, wherein:

The single figure is a schematic diagram of a signal converter embodying one form of the present invention.

The present invention is particularly adapted to be embodied in means 10 for receiving digital signals and converting them into an equivalent analog signal. More particularly, the present means 10 are adapted to receive a series of pulses of some predetermined shape and produce a signal that will have an analog amplitude that is maintained at some particular level determined by the value of the pulses until another series of pulses is received. The present means 10 includes a circuit having an input section 12 for receiving digital signals, a converter section 14 for converting the digital signals to analog signals, an output section 16 for providing the analog signals, and a limiting section 18 for providing upper and lower limits for the analog signals.

The input section 12 is adapted to receive a series of digital signals from any suitable source. By way of example, the source of digital signals may be a monitoring and/or control system similar to that disclosed and claimed in copending patent application Serial No. 315,459 filed October 11, 1963, entitled, "Control Means," in the names of Earl R. Bullock and Jerome D. Heibel and assigned of record to Minnesota Mining and Manufacturing Company. The digital signals may be in any desired form such as a pulse of current, voltage, etc. However, in the present instance the signals into the input section are a series of trains of voltage pulses. Each of the pulses in the train preferably has a predetermined constant voltage amplitude and a predetermined constant time duration. It may thus be seen that the integral of each voltage pulse will be a constant. Furthermore, each of the pulses is of equal significance with the magnitude of the digital signal being determined by the total number of pulses in the train. In addition, the various pulses in the train may be either positive or negative to indicate the polarity of the data represented by the digital signal.

The input section 12 includes a pair of conductors 20 and 22 that are adapted to be interconnected with the source of the digital signals. The input section 12 is effective to convert the voltage signals present between the conductors 20 and 22 to pulses of current having a predetermined amplitude and the same duration as the voltage pulses. More particularly, a pair of resistors 24 and 26 are provided that extend between the two lines 20 and 22. These two resistors 24 and 26 will function as a voltage divider with the junction 28 therebetween providing a voltage that is some fraction of the voltages present on the two lines 20 and 22. A pair of transistors 30 and 32 are provided that have emitters 34 and 36, bases 38 and 40 and collectors 42 and 44. The emitters 34 and 36 of the two transistors 30 and 32 are connected together and to a variable resistor 46. The resistor 46 is connected directly to the input line 20 so as to receive the full voltage across the resistors 24 and 26. By varying the resistance of resistor 46 the amplitude of the current pulses from the input section 12 will be varied. As will be seen, this will be effective to vary the sensitivity of the converter 10. The bases 38 and 40 of the two transistors 30 and 32 are interconnected directly with each other and with the junction 28 between the two resistors 24 and 26 in the voltage divider. The collectors 42 and 44 of the two transistors 30 and 32 are connected together by a pair of diodes 48 and 50. The output from the input section 12 is formed by a conductor 52 interconnected with the junction between the two diodes.

Since both of the bases 38 and 40 are at the same potential as the junction 28 and the emitters 34 and 36 are both connected to the input line 20, the base-to-emitter bias will be identical on both of the transistors 30 and 32. One of the transistors is of the so-called P-N-P type while the other is of the N-P-N type. As a result, when one of the transistors is biased "ON" the current will flow one way through the transistor and its diode. However, since the same bias will be applied to the other transistor, it will be biased "OFF" and no current can flow through the transistor.

If the digital signal is a series of voltage pulses that make the conductor 20 positive, each time one of the pulses occurs across the voltage divider, a positive potential will be present between the emitters 34 and 36 and bases 38 and 40 of the two transistors 30 and 32. This will bias the transistor 32 beyond cutoff and no current will flow through the transistor 32 or diode 50. However, this same bias will be present on the transistor 30 and will cause it to become conductive. A pulse of current will then flow through the collector 42 and diode 48 and over the output conductor 52 for return over the conductor 22. Since the input pulses are of a constant voltage, the voltage across the resistor 24 will be a constant amount during each pulse. This in turn will cause the transistor 30 to be biased so that each of the current pulses will be a constant.

In the event the incoming digital signal is a series of negative pulses, the bias between the bases 38 and 40 and emitters 34 and 36 will be reversed from the preceding example but will be of the same amplitude. As a result, the bias on the transistor 30 will cut it OFF and no current will flow through the collector 42 or diode 48. However, the reversed bias will now switch the transistor 32 ON so that current will flow through the diode 50 and collector 44. Since the voltage across the resistor 24 will be of the same magnitude as before but of reverse polarity, the current flow through the output 52 will be of the identical amplitude as before, but it will flow in the opposite direction to that occurring during the positive pulses.

It should be noted that if the voltage pulses on the inputs 20 and 22 are of uniform amplitudes and time durations, the amplitude of the current pulses on the output 52 will be uniform and the time durations will be uniform. In other words, the integral of each of the current pulses on the output will be constant.

The output 52 from the input section 12 is interconnected with the input to the converter section 14 for supplying the trains of constant current pulses thereto. Although the input section 12 may be continuously connected directly to the converter section 14, under some circumstances the interconnection is made by means of a switch 54 that intermittently connects the input section 12 with the converter section 14. More particularly, if the present converter means 10 is employed with a monitoring and controlling system, such as disclosed in said copending application Serial No. 315,459, it may be desirable to employ a time-sharing multiplex system wherein the same input section 12 is used to supply current digital signals to each of the channels. However, since the signals for the different channels may be of different magnitudes, it will be necessary to adjust the potentiometer 46 differently for the different channels. Therefore, each channel will normally include a separate input 12, converter section 14, output section 16 and limiter section 18. In this event the switch 54 includes a fixed contact 56 and a movable contact 58 that may make and break with the fixed contact 56.

A multiplex switch control 55 may be interconnected with the movable contact 58 so as to synchronously move the movable contact 58 so that it will periodically feed all of the constant current pulses in a digital signal into the correct converter section 14 at the correct time. It should be noted that if so desired the output 52 of the input section 12 may be continuously connected to the input of the converter section 14 so that the digital signals may be fed thereto at any time.

Although the converter section 14 may employ any suitable digital-to-analog form of conversion, in the present instance the converter employs a so-called solion cell 60 similar to those manufactured and sold by the Self-Organizing Systems, Inc. A solion cell 60 is an electronic device which functions by controlling and monitoring a reversible electro-chemical reaction in an electrolytic solution 62. In a solion cell 60, a so-called redox reaction is employed for reversible oxidizing and reducing one of the constituents of the electrolytic solution 62. The electrolytic solution is sealed inside of a suitable container such as a glass capsule. A pair of electrodes 64 and 66 consisting of an inert material such as platinum are provided at the opposite ends of the container. A shield electrode 68 and a readout electrode 70 consisting of an inert material are disposed between the end electrodes 64 and 66 so as to divide the space into three separate compartments 72, 74 and 76.

The shield and readout electrodes 68 and 70 are perforated to permit the electrolyte and the ions therein to circulate between the compartments. The compartment 72 between the shield 68 and the end electrode 64 is commonly referred to as the reservoir and it constitutes the largest compartment. The compartment 74 between the readout electrode 70 and the end electrode 66 is commonly called the integral compartment. Normally, the integral compartment 74 is made very small so that the equilibrium distribution of ions within the compartment 74 can be reached very quickly. The compartment 76 between the shield and the readout electrodes 68 and 70 serves to separate the two electrodes 68 and 70 from each other. The electrolyte 62 in all of the compartments 72, 74 and 76 contains both the oxidized and reduced species of an ion of the electrolyte.

When a current flows between the two end electrodes 64 and 62, the ions will flow between the reservoir 72 and the integral compartment 74. The amount of ions transferred will be an integral of the charging current that has flowed between the end electrodes 64 and 66. When a voltage is applied between the readout electrode 70 and the end electrode 66, ions will be oxidized at one electrode and reduced at the same rate at the other electrode whereby a current will flow between the electrodes. Provided the voltage between the electrodes 66 and 70 falls within a wide range of values, the magnitude of the current flow in the readout electrode 70 will be determined solely by the concentration of the ions within the integral compartment 74 and as long as the ion concentration does not vary, the current will remain constant.

It may thus be seen that the current flowing between the end electrode 66 and the readout electrode 70 will be an integral of the current that has flowed between the two electrodes 64 and 66. It should be noted that this is a completely reversible process whereby the charging current between the end electrodes 64 and 66 may flow either way and the output current in the electrode 70 can be increased and decreased as a result of the integral of the charging current increasing or decreasing.

In the present instance, the lower end electrode 66 is connected directly to the input conductor. The other end electrode 64 is interconnected with one of the fixed contacts 56 in the multiplex switch 54. The shield electrode 68 is also connected to the fixed contact 56 by means of a battery 80 that will maintain the shield electrode 68 at a potential that will form a barrier between the compartments 72 and 76. As a consequence, when the movable contact 58 moves against the fixed contact the pulses of current in the digital signal will flow between the end electrodes 64 and 66. As previously stated, the time durations and amplitudes of each of the current pulses wil be substantially constant. However, the number of current pulses in each of the signals will be a variable representing the magnitude of the digital signal.

Each time that a digital signal flows through the cell 60, the concentration of ions in the integral compartment 74 will be varied as an integral of the current in the pulses forming the digital signal. The concentration of ions will thus be proportional to the number of the pulses that were in the digital signal. It should be noted that the polarity of the original signal will be effective to determine the direction of flow of current through the cell 60. Since the process is completely reversible, the resultant change in the ion concentration will reflect not only the number of pulses, but also their polarity. It may thus be seen that by applying a voltage across the readout electrode 70 and the end electrode 66, an analog current will be produced in the readout electrode 70 having an amplitude that corresponds to the number of pulses in the original digital signal.

Normally, there is a high degree of linearity between the total charge, i.e., the integral of current fed between the electrodes 64 and 66 and the current from the readout electrode 70. However, when the frequency of the current pulses exceeds a predetermined level, the linearity tends to decrease with further increases in the frequency of the current. In the event that the frequency of the digital signals from the input section 12 exceeds the linear range, it has been found desirable to provide a storage device such as a condenser 82 across the input to the converter section 14. A resistor 84 may then be interconnected in series between the end electrode 64 and the upper side of the condenser 82.

It may be seen that even though the digital signals may be of a very high frequency, they may readily flow into the condenser 82. The condenser 82 will then accumulate a charge that is proportional to the number of pulses or the magnitude of the charge. Simultaneously with or subsequent to the pulses of current, the charge on the condenser 82 will circulate through the resistor 84 and across the electrolyte between the two end electrodes 64 and 66. By a proper choice of condensers 82 and resistors 84, the rate at which the charge is fed into the cell will be reduced to a frequency that is within the linear range of the solion cell 60.

The readout electrode 70 may be interconnected with a power supply line by means that will provide a suitable current signal. In the present instance, the interconnection includes a transistor 86 having an emitter 88, base 90 and collector 92. The emitter 88 is connected directly to the readout electrode 70 while the base 90 is connected to the input line 22 by means of a diode 94. The collector is connected to a negative power supply line 96 by means of a pair of resistors 98 and 100.

When a current flows from the readout electrode 70, it will circulate through the emitter 88 and collector 92 to the negative supply line 96. As the current flows through the resistors 98 and 100, it will develop a voltage across the resistors 98 and 100. Since the magnitude of the current flowing from the collector 92 is the same as the current signal from the readout electrode 70, the amplitude of the voltage across the resistors 98 and 100 will form a voltage signal that is an analog signal proportional to the number of current pulses from the input section 12.

It should be noted that the response of the solion cell is very sensitive to temperature. The amount of current flow from the readout electrode 70 will increase as the temperature of the cell rises. In order to eliminate the effects of temperature changes, a thermistor 102 may be disposed in parallel to one of the resistors 100. As the temperature rises and the current from the readout electrode 70 increases, the resistance of the thermistor 102 will decrease and the voltage across the two resistors 98 and 100 will remain constant.

A second transistor 104 having a base 106, collector 108 and emitter 110 is provided so as to be cascaded with the first transistor 86. More particularly, the base 106 is connected with the collector 92 and the collector 108 is connected to the negative supply line 96. The emitter 110 is connected to the base 90 of the transistor 86 and the plate of the diode 94 by means of a load resistor 112. It may be readily appreciated that the potential developed across the resistors 98 and 100 will act as the bias voltage for controlling the current flow through the resistor 112 and emitter 110 of the second transistor 104. As a consequence, the current flowing through the resistor 112 will produce an analog voltage having an amplitude that is proportional to the number of pulses of current in the original digital current signal.

A third transistor 114 having a base 116, emitter 118 and collector 120 may be provided so as to be cascaded with the first two transistors 86 and 104. The base 116 of this transistor 114 may be connected directly to the emitter 110 of the second transistor 104 while the emitter 118 is connected to the supply line 96 by means of a resistor 122. The collector 120 is connected to a positive supply line 124 by means of a pair of load resistors 126 and 128. It may be seen that the current through the two load resistors 126 and 128 will be in phase with the current from the readout electrode 70. In other words, when the current through the readout electrode 70 increases, the current through the resistors 126 and 128 will increase and vice versa. The current flowing through the two resistors 126 and 128 will, in turn, produce an analog voltage having an amplitude proportional to the magnitude of the original digital signals.

In the event it is desirable to provide an output signal that is a current signal instead of a voltage signal, the output section 16 may include a current amplifier. Accordingly, the present amplifier includes a pair of transistors 130 and 132 having bases 134 and 136, emitters 138 and 140 and collectors 142 and 144 that are connected to cascade the transistors 130 and 132.

More particularly, the first transistor 130 has its base 134 connected to the junction between the resistors 126 and 128 while the collector 142 leads to the positive supply line 124. The emitter 138 is connected to a resistor 146 that leads to the negative supply line 96. It may thus be seen that the voltage across the resistor 128 will determine the bias of the transistor 130 and therefore the emitter current through the resistor 146. The base 136 of the second transistor 132 is connected directly to the emitter 138 while the emitter 140 is connected to the positive supply line 124 by one or more resistors. The collector 144 is, in turn, interconnected with the output 148 by means of a resistor 150 so that the potential from the negative supply will be fed to the collector. In order to indicate the magnitude of the current that is flowing through the collector 144 and to the load, it may be desirable to employ a meter 152 that is connected in series with the load.

At the present time, there are a wide variety of different control systems that employ currents that vary through different ranges. In order to make the present converter means 10 of a universal nature that may be employed with a wide variety of control systems, the output section 16 may include means for determining the ranges through which the output current varies. In the present instance, this means includes a multiposition position switch 154 that has the movable contact 156 connected to the emitter 140. A separate resistor 158 is connected between the fixed contacts and the positive supply line 124. It will thus be seen that by varying the setting of the switch 154, the amount of amplification may be varied so that the current will vary in different ranges. At the same time, the switch 154 may include a second bank 159 that is effective to switch a plurality of bypass resistors 160 around the meter. This will be effective to insure the meter 152 always indicating the true response of the system.

It will thus be seen that the outputs 148 will produce an analog current having an amplitude that is determined by the digital current signals fed to the solion cell 60 from the input section 12. The signals fed into the input section 12 and to the solion cell 60 will be a series of pulse trains that occur at intermittent intervals. During the intervals between the pulse trains, there will be no signals present on the input. However, there will be a current signal present on the output 148 at all times during the intervals between successive pulse trains. The output current signal will remain a constant amount that is determined by the magnitude of the last digital signal applied to the solion cell 60.

When using the current signals from the output 148 for controlling a regulator or control unit, it is desirable to limit the maximum possible current to a value that will not overload the regulating or controlling device. In addition, it is also customary in control systems to limit the minimum current to some predetermined threshold level. As a consequence, a zero condition will be represented by a current equal to the threshold level. As a consequence, a zero current signal will be an unambiguous indication of a failure or malfunction.

In order to provide upper and lower limits for the output current, a suitable current limiting section 18 is provided. In the present instance, this is accomplished by means of a transistor 162 that is cascaded with the first and second transistors 84 and 104 but is in parallel to the third transistor 114. The base 164 of this transistor 162 is connected directly to the junction between the emitter 110 and base 116 of the second and third transistors 104 and 114. The emitter 166 is connected to the negative supply line 96 by a resistor 168 while the collector 170 is connected to the input conductor 22 by means of a resistor 172. This transistor 162 is thus arranged similar to the third transistor 144 and both of the emitters 118 and 166 will be maintained at substantially the same potential as the collector 92 of the first transistor 86.

Upper and lower limit transistors 174 and 176 having bases 178 and 180, collectors 182 and 184 and emitters 186 and 188 are cascaded with the transistor 162 and connected in parallel with each other. The upper limit transistor 174 has its base 178 connected to the collector 170 so as to be maintained at the voltage across the resistor 172. The emitter 186 is interconnected with a source 190 of a reference voltage. The potential of this source 190 is equal to a value that will insure the desired limit for the resultant current signal. The collector 182 is connected to one of the junctions 192 in a voltage dividing network which includes a plurality of resistors 194, 196 and 198 that extend between the negative and positive supply lines 96 and 124. A feedback line 200 may be provided which extends from a second junction 202 between the resistors and the upper electrode 64 in the solion cell 60. In order to prevent a loss of the current signal from the input to the solion cell, it is desirable for a blocking diode 204 to be provided in the feedback line 200. This diode 204 will permit the feedback signal to flow but will prevent signals flowing in the wrong direction.

Normally, the signal on the base 178 will be of sufficiently low amplitude to maintain the transistor 174 biased OFF. As a result, the junctions 192 and 202 in the voltage divider will be maintained at some predetermined reference levels. In the event that the magnitude of the incoming digital signal becomes sufficiently large, the potential on the base 178 will rise sufficiently to turn the transistor ON. When the transistor 174 becomes conductive, the resistor 194 will be effectively "shorted out." The potential at the junction 202 will then go sufficiently negative to make the diode 204 conductive.

When the diode 204 conducts, at least a portion of the charging current that would flow to the end electrode 64 will be diverted from the solion cell 60. This, in turn, will limit the maximum charge of current that can flow into the solion cell 60, and the maximum current flowing out of the electrode 70. It may thus be seen that the voltage at the bases 178 and 180 of the two transistors 174 and 176 will be limited to the level where the transistor 174 becomes conductive. By a proper choice of components in the circuit, this limit may be set so that the current in the output 148 will be no greater than a desired maximum.

The second transistor 176 is effective to provide a lower limit beyond which the current cannot decrease. The base 180 of this transistor 176 is connected directly to the collector 170 of the transistor 162. As a result, the bases 178 and 180 of the two transistors 174 and 176 are thus maintained at identical potentials. The emitter 188 of the transistor 176 is also connected to the reference voltage source 190. However, this is accomplished by means of a voltage dividing network having a pair of resistors 206 and 208 that extend from the source 190 to the input line 22.

The ratio of the resistances of these resistors 206 and 208 will determine the lower limit of the signal. The collector 184 is connected to a junction 210 in a second voltage dividing network which includes resistors 212, 214 and 216 that extend between the negative and positive supply lines 96 and 124. A feedback line 218 extends from the junction 219 between a pair of resistors 212 and 214 and the end electrode 64 of the solion cell 60. A blocking diode 220 may be disposed in this feedback line 218 so as to prevent current flowing in the wrong direction.

Normally, the signal on the base 180 will be sufficiently high to maintain the transistor 176 biased beyond cutoff. As a consequence, the potential at the lower junction point 210 will be some predetermined reference level. This level will be sufficient to maintain the diode 220 cut off and prevent any current flowing through the diode 220 and into and out of the solion cell 60.

In the event that the magnitude of the incoming digital signal becomes sufficiently low, the potential on the base 180 will fall below the cutoff level and the transistor 176 will conduct. When the transistor 176 conducts, the resistor 216 will be effectively shorted out. The potential at the junction 219 will then go sufficiently positive to cause the diode 220 to become conductive.

When the diode 220 conducts, a current will flow through the diode 220 and into the solion cell 60. This, in turn, will limit the minimum amount of current that will flow from the readout electrode 70. It may thus be seen that the voltages at the bases 178 and 180 of the two transistors 174 and 176 will be limited to the level where the transistor 176 becomes conductive. By a proper choice of components in the circuit, this limit may be set so that the current in the output 148 will be maintained above the desired minimum. As a consequence, if a zero signal appears at the output 148, it will be apparent that there has been a failure or malfunction.

When employing the present signal converter 10 for converting digital signals into analog signals, the digital signals will be present on the input conductors 20 and 22. Normally, these signals will be a series of voltage pulses of constant amplitude and time duration. In this event, the input section 12 is provided. If the digital signal consists of a series of positive voltage pulses of uniform amplitude and time duration, the input section 12 will convert them into a series of current pulses of uniform amplitude and time duration that will flow through the transistors 30 and diode to movable contact 58 in the multiplex switch. If the digital signals consist of a series of negative pulses, the current pulses will flow in the reverse direction through the diode 50 and transistor 32.

The current pulses of either polarity will flow between the end electrodes 64 and 66 and through the electrolyte therebetween. This current flow will be effective to cause the ions in the electrolyte 62 to flow between the various compartments 72, 74 and 76 and thereby vary the concentration of the ions in integral compartment 74. Since the amplitude of each of these current pulses is constant, the total quantity of current or charge that flows between the two end electrodes 64 and 66 will be proportional to the number of pulses forming the digital circuit. As a result, the magnitude of the change in the ion charge will be a function of the magnitude of the digital signal. Whether the ion concentration increases or decreases will depend on whether the original pulses are positive or negative. In the event the frequency of the digital pulses is above the range where the ion concentration changes linearly with the quantity of current, the condenser 82 will accumulate a charge and reduce the frequency into the linear range.

The potential on the readout electrode 70 supplied from the negative supply line 96 will cause a current to flow from the electrode 70 and through the transistor 86 to the two resistors 98 and 100. If the potential remains within the broad range where the cell responds linearly, the amplitude of the current will remain constant over extended periods of time. In addition, the amplitude of the current will be proportional to the ion charge in the integral compartment 74. As a result, the voltage across the two resistors 98 and 100 will be proportional to the magnitude of the original digital signal, i.e., the number of pulses. In the event the temperature varies, the resistance of thermistor 102 will vary conversely to the changes in the solion cell 60. As a consequence, the voltage developed across the two resistors 98 and 100 will be substantially independent of the temperature of the signal converter.

The voltage across the resistors 98 and 100 will be amplified through the two transistors 104 and 114 and produce a voltage signal across the load resistor 128. The two transistor 130 and 132 will be effective to convert this voltage signal into an amplified current signal which will then flow to the output 148. The amplitude of this current which will be indicated by the reading on the meter 152 will be proportional to the number of pulses in the digital signal being received. Incidentally, it will remain constant until such time as a new digital signal produces a current flow between the end electrodes 64 and 66 that will change the ion concentration in the integral compartment 74.

In the event that it is desired to vary the range over which the current in the output 148 may vary, the switch 154 may be set to interconnect a resistor 158 that will provide the appropriate gain for the amplifier.

In the event the digital signal tends to reduce the output current to zero, at some preselected point the voltage across the resistor 172 will decrease to a level where the transistor 176 will conduct. When the transistor 176 conducts, it will feed a current through the diode 220 and over the feedback line 200 to the solion cell 60. This will increase the current in the solion cell 60 to a level that will prevent a further decrease in the charge in the cell. This will insure the voltage across the resistors 98 and 100 being at least equal to a predetermined minimum whereby the current at the output 148 will be equal to a standardized minimum.

In the event the digital signal tends to increase the output current beyond a desired maximum at some preselected point the voltage across the two resistors 98 and 100 will become sufficiently large to bias the transistor 174 conductive. This will draw a current from the condenser 82 and/or solion cell 60 so as to decrease the charge therein. This, in turn, will be effective to limit the maximum voltage which can occur across the two resistors 98 and 100. This, in turn, will limit the amount of current that can flow in the output 148 to some predetermined selected maximum level.

It should be noted that although the foregoing signal converter 10 is entirely automatic, under some circumstances it may be desirable to provide a manual control over the current in the output 148. Accordingly, a pair of switches 220 and 222 may be provided between the negative supply line 96 and positive supply line 124. A selector switch 226 may then be provided for switching from its automatic position as shown to engage contact 228. When the switch 226 is in this position, the digital signals will have no effect upon the charge flowing into or out of solion cell 60. However, by closing one or the other of the switches 220 and 222, current may be made to flow directly through the solion cell 60 until the current in the output 148 is adjusted to the desired level.

While only a single embodiment of the present invention is disclosed and described herein, it will be readily apparent to persons skilled in the art that numerous changes and modifications may be made without departing from the scope of the invention. Accordingly, the foregoing disclosure and description thereof are for illustrative purposes only and do not in any way limit the invention which is defined only by the claims which follow.

What is claimed is:

1. Apparatus for converting a digital signal into an analog signal having an amplitude that is proportional to the magnitude represented by said digital signal, said apparatus including the combination of:

storage means including a solion cell having input means and output means, said solion cell being constructed to receive the digital signal at its input means and accumulate a charge proportional to said digital signal and to maintain said charge for an extended period of time without any appreciable change in the charge, said solion cell being constructed to provide at its output means an output signal proportional to the charge accumulated in said solion cell, an input connected to receive said digital signals, said input being interconnected with the input means of said solion cell for introducing said digital signals into said storage means, an output interconnected with the output means of said solion cell for providing an output signal that is proportional to the charge accumulated in said storage means, and control means interconnected with said output and with said input means and responsive to the output signal to vary the charge accumulated in the storage means for maintaining the charge in the storage means within particular limits when said output signal is outside of said particular limits.

2. Apparatus for converting a digital signal defined by a sequence of voltage pulses into an analog signal having an amplitude proportional to the number of voltage pulses in said digital signal, said apparatus including the combination of:

storage means including a solion cell having input means constructed to receive the digital signal, said solion cell being constructed to accumulate a charge dependent upon said digital signal, said solion cell including output means constructed to provide a signal having an amplitude proportional to the charge in said storage means, an input connected to receive said digital signal, said input including means constructed to convert said voltage pulses into current pulses having a magnitude and duration dependent upon the magnitude and duration of the voltage pulses, said input being interconnected with said input means for introducing said current pulses into said solion cell, and an output interconnected with the output means of said storage means for producing an output signal having an amplitude proportional to the charge accumulated in said storage means.

3. Apparatus for converting a digital signal into an analog signal having an amplitude that is proportional to the magnitude represented by said digital signal, said apparatus including the combination of:

input means connected to receive said digital signal, a solion cell having at least one input electrode and at least one output electrode and constructed to provide for extended periods of time a charge proportional to any signals introduced to it, means interconnecting said input means with said input electrode of the solion cell for supplying said digital signal to said cell to obtain a charge in said cell in accordance with the characteristics of said digital signal, and output means interconnected with the output electrode of said cell for producing a signal that is proportional to the charge accumulated in said cell.

4. Apparatus for converting a digital signal having a sequence of pulses into an analog signal having an amplitude that is proportional to the number of pulses in said digital signal, said apparatus including the combination of:

input means connected to receive said digital signal, a solion cell having at least one input electrode and at lease one output electrode and constructed to provide a charge for an extended period of time in accordance with the characteristics of signals introduced to the input electrode, means including a storage condenser interconnected with said input means and with said input electrode to limit the frequency of the sequence of pulses and to produce a charge in accordance with the number of pulses in the sequence and the frequency of the pulses and to introduce such charge to the input electrode of the solion cell for varying the charge in the solion cell, and output means interconnected with said output electrode of said cell for producing a current flow that is proportional to the charge accumulated in said cell.

5. Apparatus for converting a digital signal into an analog signal having an amplitude dependent upon the magnitude represented by said digital signal, said apparatus including the combination of:

input means connected to receive said digital signal, a solion cell having at least one input electrode and at least one output electrode and constructed to accumulate and maintain over extended periods of time a charge dependent upon the characteristics of signals introduced to said solion cell, means interconnecting said input means with said input electrode for supplying said digital signal to said cell, output means interconnected with said output electrode of said cell for producing a current flow dependent upon the charge accumulated in said cell, a resistive load in said output means, said resistive load being disposed in series with said current flow to develop a voltage signal thereacross, and resistive means in said load, said resistive means being responsive to temperature to change the resistance of said load in accordance with variations in said temperature.

6. Apparatus for converting a digital signal having a sequence of voltage pulses into an analog signal having an amplitude dependent upon the number of pulses in said digital signal, said apparatus including the combination of:

input means connected to receive said voltage pulses and to provide a current signal having an integral that is proportional to the number of said voltage pulses, a solion cell having at least one input electrode and a readout electrode, said solion cell being constructed to provide a charge and to vary its charge in response to the integral of any current flowing to said input electrode, means interconnecting said input electrode with said input means for circulating said current signal from said input means through said cell to vary the charge in said cell in accordance with the integral of said current, output means interconnected with the readout electrode of said cell and responsive to the charge in said solion cell for producing a signal having an amplitude dependent upon the charge in the solion cell, and means interconnecting the output means and the input electrode of the solion cell for retaining the charge in the solion cell within particular limits regardless of the characteristics of the voltage pulses introduced to the input means.

7. Apparatus for converting a digital signal having a sequence of voltage pulses into an analog signal having an amplitude dependent upon the number of pulses in said digital signal, said apparatus including the combination of:

input means connected to receive said voltage pulses, current means interconnected with said input means to provide a current signal having an integral dependent upon the number of said voltage pulses, a solion cell having a pair of end electrodes and a readout electrode, said solion cell being constructed to vary its charge in response to the integral of any current flowing between said end electrodes and to provide an output at the readout electrode in accordance with the charge in the solion cell, means interconnecting said end electrodes with said current means to vary the charge in said cell in accordance with the integral of said current signal, and output means interconnected with the readout electrode of said cell and responsive to the output at the readout electrode for producing a signal having an amplitude dependent upon the charge in the solion cell.

8. Apparatus for converting a digital signal having a sequence of voltage pulses into an analog signal having an amplitude dependent upon the number of pulses in said digital signal, said apparatus including the combination of:

input means connected to receive said voltage pulses, signal converting means interconnected with said input means to receive said voltage pulses, said converting means including electrically conductive means responsive to said voltage pulses to provide a series of current pulses, a solion cell having a pair of input electrodes and a readout electrode, said solion cell being constructed to provide a variable charge in response to the integral of any current flowing between said input electrodes and to maintain said charge over an extended period of time without any material change in such charge, means interconnecting said end electrodes with said signal converting means for circulating said current from said signal converting means between said end electrodes to vary the charge in said cell in accordance with such current, capacitive means connected in parallel with said input electrodes to accumulate a charge and transfer such charge to said input electrodes within particular frequency limits regardless of the frequency of the sequence of voltage pulses, output means interconnected with the readout electrode of said cell and responsive to the charge in the solion cell for producing the analog signal with an amplitude dependent upon such charge, and means connected to the output means and at least one of the input electrodes of the solion tube for maintaining the charge in the solion tube within particular limits regardless of the characteristics of the voltage pulses received by the input means.

9. Apparatus for converting a digital signal having a sequence of voltage pulses into an analog signal having an amplitude that is proportional to the number of pulses in said digital signal, said apparatus including the combination of:

input means connected to receive said voltage pulses, second means interconnected with said input means for receiving said voltage pulses, said second means being responsive to said voltage pulses to convert each of said voltage pulses into a current pulse of substantially constant amplitude and time duration, a solion cell having an electrolytic solution, a pair of input electrodes disposed in said solution and a readout electrode disposed between said input electrodes, the solion cell being constructed to produce a charge in the electrolyte in accordance with the characteristics of any current flowing between the input electrodes, means interconnecting said input electrodes with said second means for circulating said current pulses between said input electrodes and through said electrolyte for varying the charge in the electrolyte in accordance with the number of current pulses, and output means interconnected with the readout electrode of said cell for producing the analog signal in accordance with the charge in said electrolyte.

10. Apparatus for converting a digital signal having a sequence of pulses into an analog signal having an amplitude that is proportional to the number of pulses in said digital signal, said apparatus including the combination of:

input means connected to received said sequence of pulses, a solion cell having an electrolyte in the cell with a pair of input electrodes immersed in said electrolyte and a readout electrode disposed between the input electrodes to receive a charge in the electrolyte in accordance with the introduction of pulses to the input electrodes, means interconnecting said input means with said input electrodes for introducing said sequence of pulses to said electrolyte, output means interconnected with the readout electrode of said cell for producing the analog signal in accordance with the charge accumulated in said cell, first signal-limiting means responsive to the amplitude of the analog signal on said readout electrode to introduce an additional voltage between said input electrodes when the amplitude of the analog signal on said readout electrode tends to be less than a first particular amount, and second signal-limiting means responsive to the amplitude of the analog signal on said readout electrode to reduce the voltage between said input electrodes when the amplitude of the analog signal on said readout electrode tends to be greater than a second particular amount.

References Cited by the Examiner

UNITED STATES PATENTS

| | | | |
|---|---|---|---|
| 2,963,698 | 12/1960 | Slocomb | 340—347 |
| 3,017,612 | 1/1962 | Singer | 317—231 |
| 3,025,470 | 3/1962 | Sarzin et al. | 332—1 X |

OTHER REFERENCES

"An Introduction to Solions," Texas Research and Electronics Corp., February 1962, Dallas, Tex., pp. 1–9.

ROY LAKE, *Primary Examiner.*

A. L. BRODY, *Assistant Examiner.*